Patented Jan. 18, 1949

2,459,191

UNITED STATES PATENT OFFICE 2,459,191

SEPARATION OF PYRIDINE BASES

Kenneth H. Slagle, Mount Lebanon, and Robert S. Bowman, Pittsburgh, Pa., assignors to Jones & Laughlin Steel Corporation, Pittsburgh, Pa., a corporation of Pennsylvania No Drawing. Application January 7, 1947, Serial No. 720,674

5 Claims. (Cl. 260—290)

This invention relates to a process of separating one from another the pyridine bases comprising the fraction known industrially as the "beta-gamma-picoline fraction," obtained from the fractional distillation of coal tar, or from coke oven gas.

An object of our invention is to provide a process for fractionating this group of pyridine bases. Another object is to provide a process for obtaining the components of this group in a reasonably high state of purity. Another object is to provide a commercially feasible process of obtaining these component bases.

The so-called "beta-gamma-picoline fraction" comprises the three pyridine bases boiling in the neighborhood of 144° C.; beta- or 3-picoline, boiling at 144.0° C., gamma- or 4-picoline, boiling at 144.6° C., and 2,6-lutidine, boiling at 144.4° C. All these components are industrially useful, but because of the virtual coincidence of their boiling points and the complete miscibility of all three with water, alcohols, ketones, and hydrocarbon solvents, they cannot be separated by conventional distillation or solvent extraction processes. A number of processes for their separation has been devised, but none has been successful in fractionating the mixture into its constituent components of reasonably high purity at a reasonable cost.

We have invented a process of fractionating this mixture of picolines and lutidine which yields the components in a high degree of purity. Our invention is based on the technique of fractional freezing, or crystallization.

The melting points of the pure pyridine bases are not grouped as closely as the boiling points; 4-picoline melts at +3.8° C., 2,6-lutidine at —6.0° C. and 3-picoline at —18.3° C. It would appear that this range is great enough to afford at least a partial separation of the constituents by fractional freezing, but this is not, in fact, the case. All three constituents exhibit the phenomenon of undercooling to such an extent that when freezing finally starts the entire mixture solidifies in an amorphous mass. We have discovered, however, that the benzoates of the picoline and lutidine bases exhibit undercooling characteristics such that they can be separated by fractional freezing. Our process, then, comprises the addition of benzoic acid to the beta-gamma-picoline fraction, controlled cooling to produce selective crystallization of at least two of the three benzoates in turn, each crystallization stage being followed by filtering or centrifuging to separate solid and liquid phases, and finally resolution of each benzoate into the original pyridine base and benzoic acid.

When benzoic acid is added to the picoline-lutidine mixture and the solution slowly cooled, the 2,6-lutidine benzoate first crystallizes, followed by the 4-picoline benzoate. It is not feasible to crystallize the 3-picoline benzoate from the remaining solution, as it undercools severely. We find it more practical to purify this 3-picoline benzoate concentrate by regenerating the 3-picoline with a strong alkali, again adding benzoic acid, and again freezing out 2,6-lutidine and 4-picoline benzoates.

We also find that although it is possible to carry out the separation as above described, the process is more easily managed if the mixture of benzoates is diluted with a solvent, preferably a hydrocarbon solvent such as toluene. The addition of such a solvent reduces the viscosity of the liquid at low temperatures, and facilitates the steps of filtering or centrifuging the solid from the liquid phases.

The process of our invention will now be described in detail. To the mixture of pyridine bases is added a substantially molecular equivalent of benzoic acid. Sufficient toluene or other hydrocarbon solvent is added to reduce the viscosity of the mixture to a low value. The mixture is cooled without stirring to a temperature in the range —7° to —10° C., preferably the lower figure. At this temperature needle crystals of the 2,6-lutidine benzoate begin to form and separate from the liquid. The mixture is held at this temperature for a time sufficient to allow the bulk of the lutidine compound to freeze, and the solids and liquid are separated by any convenient means, such as vacuum filtration or centrifuging. In this stage about 80% of the 2,6-lutidine is obtained as a benzoate of substantially 100% purity.

The 2,6-lutidine is recovered by dissolving the lutidine benzoate in water, adding slightly more sodium hydroxide, or other strong base, than is equivalent to the benzoic acid, and distilling off the 2,6-lutidine-water azeotrope. Dry 2,6-lutidine is obtained by refluxing the lutidine-water solution with benzene, separating the water, and fractionally distilling the resulting benzene-lutidine mixture. The 2,6-lutidine so recovered is substantially 100% pure.

The liquid mixture remaining after filtration of the 2,6-lutidine benzoate crystals is slowly cooled to a temperature of about —20° C. During this cooling a 2,6-lutidine-4-picoline intermediate crystallizes and is separated from the liquid. As this intermediate is small in amount, totalling perhaps 7% of the starting material, it is merely added to the next batch of raw material treated.

The liquid mixture at −20° C. is seeded with crystals of 4-picoline benzoate, which initiate crystallization of this compound from the liquid. These crystals, of plate form, are separated from the liquid, again by vacuum filtration or centrifuging, and the dry 4-picoline of about 95% purity is recovered by exactly the same methods as are used for the 2,6-lutidine.

The separation of the crystals of 4-picoline benzoate leaves a filtrate which is about a 70% concentration of 3-picoline benzoate. As previously mentioned, this concentrate may be further treated by first regenerating with a strong alkali, such as sodium hydroxide, to obtain the pyridine bases, which are separated from the sodium benzoate by steam distillation. Benzoic acid is added to the mixture of pyridine bases and the mixture of benzoates is then subjected a second time to the fractional crystallization process as herein described, which results in some further yield of 2,6-lutidine and 4-picoline. The concentration of the 3-picoline mixture cannot be raised above about 80%, however, as the other two components appear to be soluble in 3-picoline to some extent even at low temperatures.

The benzoic acid used in our process need not be lost, but may be regenerated from the solution of caustic compound, in every case, by acidifying the solution with a mineral acid, such as sulfuric acid. The sulfuric acid displaces the weaker benzoic acid from the compound, and the benzoic acid, having a low solubility in water, separates from the water and sulfate, and may be obtained by filtering or centrifuging.

The yield of the process of our invention is reasonably high. For example, to a ten gallon batch of the beta-gamma-picoline fraction weighing 80 pounds may be added 103 pounds of benzoic acid and 1.3 gallons of toluene. From this may be obtained 17 pounds of 2,6-lutidine and 30 pounds of 4-picoline, each of a purity above 95%, and 28.5 pounds of about 80% 3-picoline concentrate. In addition about 98 pounds of the benzoic acid may be recovered at a cost of 45 pounds of sulfuric acid and about 36 pounds of sodium hydroxide.

The invention is not limited to the preferred embodiment but may be otherwise embodied or practiced within the scope of the following claims.

We claim:

1. The method of separating a mixture of the pyridine bases 3-picoline, 4-picoline and 2,6-lutidine, which comprises adding benzoic acid and toluene to the mixture, cooling slowly to a temperature in the range −7° to −10° C., whereby the 2,6-lutidine benzoate is caused to crystallize, separating these crystals from the liquid, cooling this liquid to a temperature of about −20° C., whereby the 4-picoline benzoate is caused to crystallize, separating these crystals from the liquid, and regenerating the pyridine bases from their respective benzoates.

2. The method of separating a mixture of the pyridine bases 3-picoline, 4-picoline and 2,6-lutidine, which comprises adding benzoic acid and toluene to the mixture, cooling slowly to a temperature in the range −7° to −10° C., whereby the 2,6-lutidine benzoate is caused to crystallize, separating these crystals from the liquid, cooling this liquid to a temperature of about −20° C., whereby the 4-picoline benzoate is caused to crystallize, separating these crystals from the liquid, adding strong alkali to the liquid to regenerate a mixture of pyridine bases, separating the mixture of pyridine bases, adding benzoic acid, subjecting the solution containing the mixture of benzoates to selective crystallization, selectively separating the solid benzoates from the solution, and regenerating the pyridine bases from their respective benzoates.

3. In a method of separating a mixture of the pyridine bases 3-picoline, 4-picoline and 2,6-lutidine, the steps which comprise adding benzoic acid to the mixture, cooling to a temperature below the freezing point of 2,6-lutidine benzoate but above the freezing points of 4-picoline benzoate and 3-picoline benzoate, separating the resulting crystals from the liquid, cooling the liquid to a temperature below the freezing point of 4-picoline benzoate but above the freezing point of 3-picoline benzoate, and separating the resulting crystals from the liquid.

4. In a method of separating a mixture of the pyridine bases 3-picoline, 4-picoline and 2,6-lutidine, the steps which comprise adding benzoic acid and a solvent to the mixture, cooling to a temperature below the freezing point of 2,6-lutidine benzoate but above the freezing points of 4-picoline benzoate and 3-picoline benzoate, separating the resulting crystals from the liquid, cooling the liquid to a temperature below the freezing point of 4-picoline benzoate but above the freezing point of 3-picoline benzoate and separating the resulting crystals from the liquid.

5. In the method of separating 2,6-lutidine from a mixture of pyridine bases containing the same and at least one of the other pyridine bases 3-picoline and 4-picoline, the steps which comprise adding benzoic acid to the mixture, cooling to a temperature below the freezing point of 2,6-lutidine benzoate but above the freezing points of the other pyridine base benzoates, separating the resulting crystals from the liquid, and regenerating 2,6-lutidine from said crystals.

KENNETH H. SLAGLE.
ROBERT S. BOWMAN.

REFERENCES CITED

The following references are of record in the file of this patent:

UNITED STATES PATENTS

| Number | Name | Date |
|---|---|---|
| 2,402,158 | Glowaki | June 18, 1946 |
| 2,432,063 | Cislak | Dec. 2, 1947 |
| 2,432,064 | Cislak | Dec. 2, 1947 |
| 2,432,065 | Cislak | Dec. 2, 1947 |